March 1, 1938. A. WELTER 2,109,811
PROCESS FOR DEHYDRATING TRIALKALI ORTHOPHOSPHATE
Filed Dec. 23, 1935
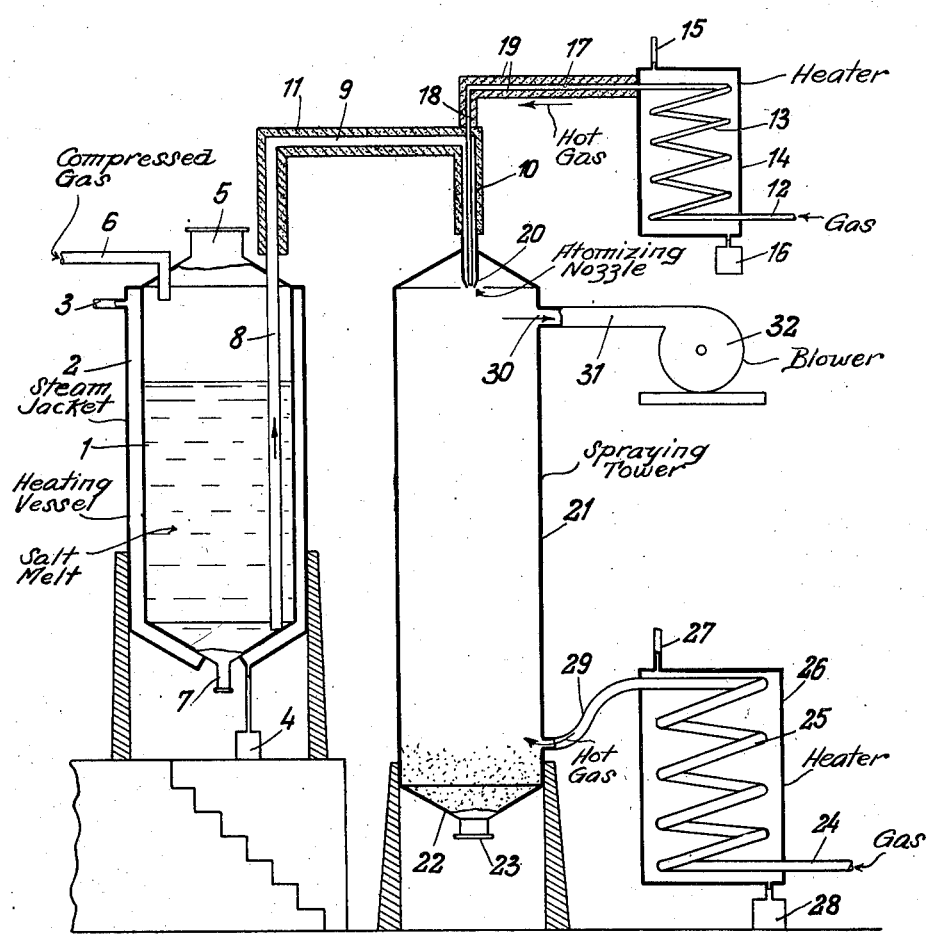

Patented Mar. 1, 1938

2,109,811

UNITED STATES PATENT OFFICE 2,109,811

PROCESS FOR DEHYDRATING TRIALKALI ORTHOPHOSPHATE

Adolf Welter, Krefeld-Rheinhafen, Germany

Application December 23, 1935, Serial No. 55,935
In Germany November 28, 1933

6 Claims. (Cl. 23—107)

This invention relates to a process for dehydrating trialkali orthophosphate, more particularly trisodium orthophosphate, $Na_3PO_4$, with ten or twelve molecules, i. e. with 52 or 56%, of water. The need for such an anhydrous salt has greatly increased in recent years for use as an addition agent for soap, which is to be used also in hard water, but the drawback was discovered that the trialkali phosphate retained the said very high water content so tenaciously that it was quite impossible in practice to effect a complete drying. Furthermore, even a dehydration carried out only up to 7 or 8%, or even up to about 15%, water content made the product so much more expensive that there were distinct limits to the possibilities of using the same.

In practice only two drying processes came for the most part into consideration, viz. drying on wicker-work in which operations had to be carried out very cautiously and slowly until finally caking of the salt put a check to further drying, and a whipping of the salt fused in its water of crystallization. However, this also could not be carried out up to the point of complete drying since the mass caked together before this and could not then be further stirred.

Attempts have also already been made to atomize the salt in a cold or hot air stream without, however, producing thereby any removal of the water of crystallization at all. The applicant has now discovered that the best results are obtained with the atomization process hitherto held to be unutilizable for the dehydration of trisodium phosphate, and in fact the water content is diminished to only 2 to 3% with very considerably diminished costs, if on the one hand the air stream within which atomization is effected is heated to at least 60° C., whilst on the other hand a temperature of at least 130° C. is imparted to the atomizing air. The temperatures of the air stream and atomizing air do not exceed 200° C. Only the conjunction of these two expedients, which have never hitherto been taken into consideration renders possible this new very surprising action at temperatures lying substantially below the temperature limits which were thought to have been necessary for a complete dehydration of the salt (according to Gmelin-Kraut 200° C.) and which practically were unutilizable.

According to the new process operations may also more particularly be carried out so that the salt to be atomized is fused in its own water of crystallization and is atomized out of the pressure vessel. For this purpose salt which has been dried by centrifuging is fused in autoclaves at about 10 atm. pressure and is atomized under this intrinsic pressure. The hot air stream into which the atomization is carried out may be produced in any desired way.

An apparatus for carrying out the new process is shown diagrammatically in the drawing. 1 is a vessel in which the salt containing water of crystallization and to be atomized is melted or fused. 2 is a steam jacket having a steam inlet 3 and condensate separator 4. 5 is the inlet for the salt coming from the centrifuge and only externally dry. 6 is a supply pipe for compressed air. 7 is an outlet for melted salt. 8 is an ascending pipe and 9 a further pipe for laterally removing the content of the vessel 1 under pressure. A pipe 10 branches from this pipe downwardly. All pipes 8 to 10 are provided in their exposed parts with heat insulating means 11.

Compressed air is admitted at 12 which comes from a compressor not shown. The air is heated to the necessary degree in the coil 13 by means of a steam jacket 14. 16 is the corresponding steam trap. The discharged hot air passes through pipe 17 to the pipe 9, 10 and downwardly to the lower part of the section 18. Pipes 17 and 18 in the exposed section are protected against cooling by insulating means 19. There is provided at the lower end of the pipes 10 and 18 the nozzle 20 where the melted or fused salt is atomized by the hot compressed air in the tower 21. The atomized salt is collected at the bottom 22 of the tower 21. An opening 23 allows of the discharge of the dry product.

Air passing through the tower 21 at 24 enters a coil 25 and is still cool, the said coil being surrounded by a steam jacket 26. Steam is admitted at 27; 28 is a condensate separator. Pipe 29 leads the heated air to the tower 21, whence it is discharged above at 30 and is conveyed through the pipe 31 by the blower 32 into the open air and is supplied to a washer not shown.

Such an apparatus may be supplied in any shape and size. It is only necessary that the fused or melted hot salt is atomized by hot air and that the dust is then immediately subjected to the action of a second hot air stream which carries along the moisture adhering thereto.

What I claim is:—

1. A process for dehydrating trialkali orthophosphate, consisting in atomizing a concentrated solution of the salt below 200° C. into a hot gas stream having a temperature of at least 60° C. by contacting said solution with a stream of atomizing gas having a temperature of at least 130° C., neither of the gas temperatures exceeding 200° C.

2. A process for dehydrating trialkali orthophosphate, consisting in atomizing a concentrated solution of the salt below 200° C. into a hot air stream having a temperature of at least 60° C., by contacting a stream of said solution with a stream of atomized air having a temperature of at least 130° C., neither of the air temperatures exceeding 200° C.

3. A process for dehydrating trialkali orthophosphate, consisting in fusing the salt in its water of crystallization below 200° C. and contacting the resulting liquid with a stream of gas of at least 130° C. so as to atomize the liquid into a hot air stream having a temperature of at least 60° C., neither of the gas temperatures exceeding 200° C.

4. A process for dehydrating trialkali orthophosphate, consisting in fusing the salt in its water of crystallization below 200° C. and under a gas pressure and contacting a stream of the resulting liquid with a stream of gas of at least 130° C., so as to atomize the liquid into a gas stream having a temperature of at least 60° C., neither of the gas temperatures exceeding 200° C.

5. A process for dehydrating trialkali orthophosphate consisting in fusing the salt in its water of crystallization below 200° C. and under a high gas pressure and contacting a stream of the resultant liquid with a stream of gas of at least 130° C., so as to atomize the liquid into a stream of hot air having a temperature of at least 60° C., neither of the gas temperatures exceeding 200° C.

6. A process for dehydrating trialkali orthophosphate as claimed in claim 3, consisting in fusing the salt under pressure and utilizing this pressure on the fused salt for assisting the atomization of the latter.

ADOLF WELTER.